(12) United States Patent
Seki et al.

(10) Patent No.: US 7,816,438 B2
(45) Date of Patent: Oct. 19, 2010

(54) FLAME-RETARDANT POLYAMIDE COMPOSITION

(75) Inventors: Masashi Seki, Sodegaura (JP); Kunihiro Ohuchi, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 41 days.

(21) Appl. No.: 11/887,841

(22) PCT Filed: Mar. 9, 2006

(86) PCT No.: PCT/JP2006/304651

§ 371 (c)(1), (2), (4) Date: Oct. 4, 2007

(87) PCT Pub. No.: WO2006/112205

PCT Pub. Date: Oct. 26, 2006

(65) Prior Publication Data

US 2009/0069478 A1    Mar. 12, 2009

(30) Foreign Application Priority Data

Apr. 8, 2005    (JP) .............................. 2005-111678

(51) Int. Cl.
*C08K 3/38*    (2006.01)
*C08K 3/10*    (2006.01)

(52) U.S. Cl. ...................... 524/405; 524/409

(58) Field of Classification Search .................. 524/405
See application file for complete search history.

(56) References Cited

U.S. PATENT DOCUMENTS

| 4,552,912 | A | 11/1985 | Williams |
| 6,833,402 | B2 | 12/2004 | Ouchi |
| 2004/0248719 | A1 | 12/2004 | Yano et al. |
| 2007/0267607 | A1 | 11/2007 | Ohkawa |

FOREIGN PATENT DOCUMENTS

| CN | 1341648 A | 3/2002 |
| CN | 1341684 A | 3/2002 |
| EP | 0122699 A2 | 10/1984 |
| EP | 0410301 B2 | 1/1991 |
| EP | 1068263 | 1/2001 |
| JP | 59-189165 | 10/1984 |
| JP | 05-320503 A | 12/1993 |
| JP | 08-239574 A | 9/1996 |
| JP | 2000-265055 A | 9/2000 |
| JP | 2000265055 A * | 9/2000 |
| JP | 2001-501251 A | 1/2001 |
| JP | 2001-207053 | 7/2001 |
| JP | 2001-220441 | 8/2001 |
| JP | 2001220441 A * | 8/2001 |
| JP | 2002-506905 | 3/2002 |
| JP | 2002-506910 A | 3/2002 |
| JP | 2003-128913 A | 5/2003 |
| TW | 245734 | 12/2005 |
| WO | WO 98/14510 | 4/1998 |
| WO | WO 99/47597 | 9/1999 |
| WO | WO 99/47606 | 9/1999 |

OTHER PUBLICATIONS

Translation of JP2000-265055, Sep. 2000.*
Translation of JP2001-220441, Aug. 2001.*
Derwent abstract of JP 2001-220441, Aug. 14, 2001.
Machine translation of JP 2001-220441, Aug. 14, 2001.
Office Action issued in corresponding Chinese Application No. 2006800109563, mailed Aug. 28, 2009.
Office Action issued in corresponding Chinese Application No. 2006800109563, mailed Aug. 28, 2009.

* cited by examiner

*Primary Examiner*—Ling-Siu Choi
*Assistant Examiner*—Hui Chin
(74) *Attorney, Agent, or Firm*—Buchanan Ingersoll & Rooney PC

(57) ABSTRACT

To provide a polyamide resin composition which inhibits generation of a gas, formation of decomposition products and discoloration of molded articles even under high molding temperature conditions, is excellent in incombustibility and toughness, and heat resistance in a reflow soldering step being required for surface mounting. The present invention provides a flame-retardant polyamide composition comprising 20 to 80% by mass of polyamide (A), 5 to 40% by mass of a flame retardant (B), 0.01 to 0.45% by mass of an antimony compound (C) and 0.5 to 10% by mass of a salt of zinc or calcium (D).

12 Claims, 1 Drawing Sheet

FLAME-RETARDANT POLYAMIDE COMPOSITION

TECHNICAL FIELD

The present invention relates to a flame-retardant polyamide composition which is excellent in mechanical properties, such as toughness, and heat resistance in a reflow soldering step, inhibits formation of decomposition products in a molding process and can improve discoloration of molded articles.

More particularly, the present invention relates to a flame-retardant polyamide composition which is particularly suitable for producing electrical and electronic parts such as fine pitch connectors having thin wall and short distance between connector terminals.

BACKGROUND ART

As materials for molding electronic parts, polyamide resins moldable into prescribed shapes by heat melting have been used in the past. In general, nylon 6, nylon 66, etc. have been widely used as the polyamides. Such aliphatic polyamides have excellent moldability but do not have sufficient heat resistance as raw materials for producing surface mount parts such as connectors that are exposed to such high temperatures as in a reflow soldering step. With such a background, nylon 46 has been developed as a polyamide having high heat resistance, but it has a problem of high water absorption. On that account, electrical and electronic parts molded by the use of a resin composition comprising nylon 46 suffer change in dimension because of water absorption, and if the molded article absorbs water, a problem of occurrence of blister, i.e., bulge, due to heating in the reflow soldering step is brought about. In contrast therewith, an aromatic polyamide derived from an aromatic dicarboxylic acid such as terephthalic acid and an aliphatic alkylene diamine has been developed. This aromatic polyamide has a feature that it not only has much more excellent heat resistance, mechanical strength and rigidity as compared with aliphatic polyamides such as nylon 66 and nylon 46 but also exhibits low water absorption.

Although polyamide resins are inherently self-extinguishing, they need to be blended with a flame retardant when they are used for surface mount parts requiring high incombustibility or flame resistance such as V-0 that is defined by Underwriters Laboratories Standard UL94. In general, it is publicly known technique that a compound referred to as a flame retardant assistant is properly added to allow a small amount of a flame retardant to exert a high flame retarding effect, in order to limit the amount of the flame retardant to a minimum. In the case of compositions having the same V-0, a composition containing a smaller amount of a flame retardant, that is, a composition containing a higher proportion of a polyamide resin, has an advantage of higher mechanical strength of the resulting molded article, such as toughness.

A system using a halogen compound as a flame retardant and using an antimony compound, such as antimony oxide or sodium antimonate, as a flame retardant assistant has been hitherto known to be a most typical flame retarding system satisfying the above requirement. In the case of the polyamide resins applied to the aforesaid uses, however, the molding temperature is generally high and not lower than 280° C. Consequently, in the presence of the antimony compound, decomposition or deterioration of the flame retardant, the polyamide resin, etc. is liable to take place, and troubles relating to occurrence of defectives, such as cleaning of a mold and discoloration of molded articles due to generation of a decomposition gas, are liable to occur. Thus, the polyamide resins are inferior in molding stability. In particular, polyamide resins having aromatic groups have high carbide-forming ability and have a problem of occurrence of discolored matters such as black spots.

In patent documents 1 to 5, polyamide compositions using an antimony compound and a non-antimony compound as flame retardant assistants are disclosed. By the use of such polyamide compositions, a flame retarding effect is obtained, but there reside problems in moldability, heat stability such as generation of a gas in the molding process and mechanical properties of molded articles obtained by molding the resins.

Patent document 1: Japanese Patent Laid-Open Publication No. H05-320503

Patent document 2: Japanese Patent Laid-Open Publication No. 265055/2000

Patent document 3: Japanese Patent Laid-Open Publication No. 501251/2001

Patent document 4: Japanese Patent Laid-Open Publication No. 506910/2002

Patent document 5: Japanese Patent Laid-Open Publication No. 128913/2003

DISCLOSURE OF THE INVENTION

Problem to be Solved by the Invention

It is an object of the present invention to provide a flame-retardant polyamide composition which exhibits excellent molding stability under high molding temperature conditions, generates a small quantity of a gas by decomposition of a flame retardant or the like in the molding process, can improve discoloration of molded articles and is excellent in incombustibility, mechanical properties and heat resistance in a reflow soldering step, said heat resistance being required for surface mounting.

Means to Solve the Problem

The present inventors have earnestly studied under such circumstances as described above, and as a result, they have found that a flame-retardant polyamide composition comprising a polyamide resin of specific constitution, a flame retardant, and as flame retardant assistants, an antimony compound and a salt of zinc or calcium is a material which exhibits excellent molding stability, generates a small quantity of a gas by decomposition of a flame retardant or the like, has excellent incombustibility and mechanical properties and is excellent in heat resistance that is required for surface mounting in a reflow soldering step, particularly in a reflow soldering step using a lead-free solder that requires higher heat resistance than before.

That is to say, the present invention provides:

(1) a flame-retardant polyamide composition comprising 20 to 80% by mass of a polyamide resin (A), 5 to 40% by mass of a flame retardant (B), 0.01 to 0.45% by mass of an antimony compound (C) and 0.5 to 10% by mass of a salt of zinc or calcium (D), (2) the flame-retardant polyamide composition as described in the above (1), which further comprises 0 to 60% by mass of at least one substance selected from glass, mica and titanium oxide as a reinforcement (E), (3) a molded article and an electrical or electronic part obtained by molding the flame-retardant polyamide composition as described in the above (1) or (2), and (4) a process for producing the flame-retardant polyamide composition as described in the above (1) or (2).

EFFECT OF THE INVENTION

By the use of the flame-retardant polyamide composition of the present invention, the quantity of a gas generated in the melt molding process is small, discoloration of molded articles are few, and stable moldability is obtained. Further, molded articles excellent not only in incombustibility and mechanical properties but also in heat resistance required for surface mounting can be obtained. Therefore, the flame-retardant polyamide composition is of industrially great value.

Figure 1:
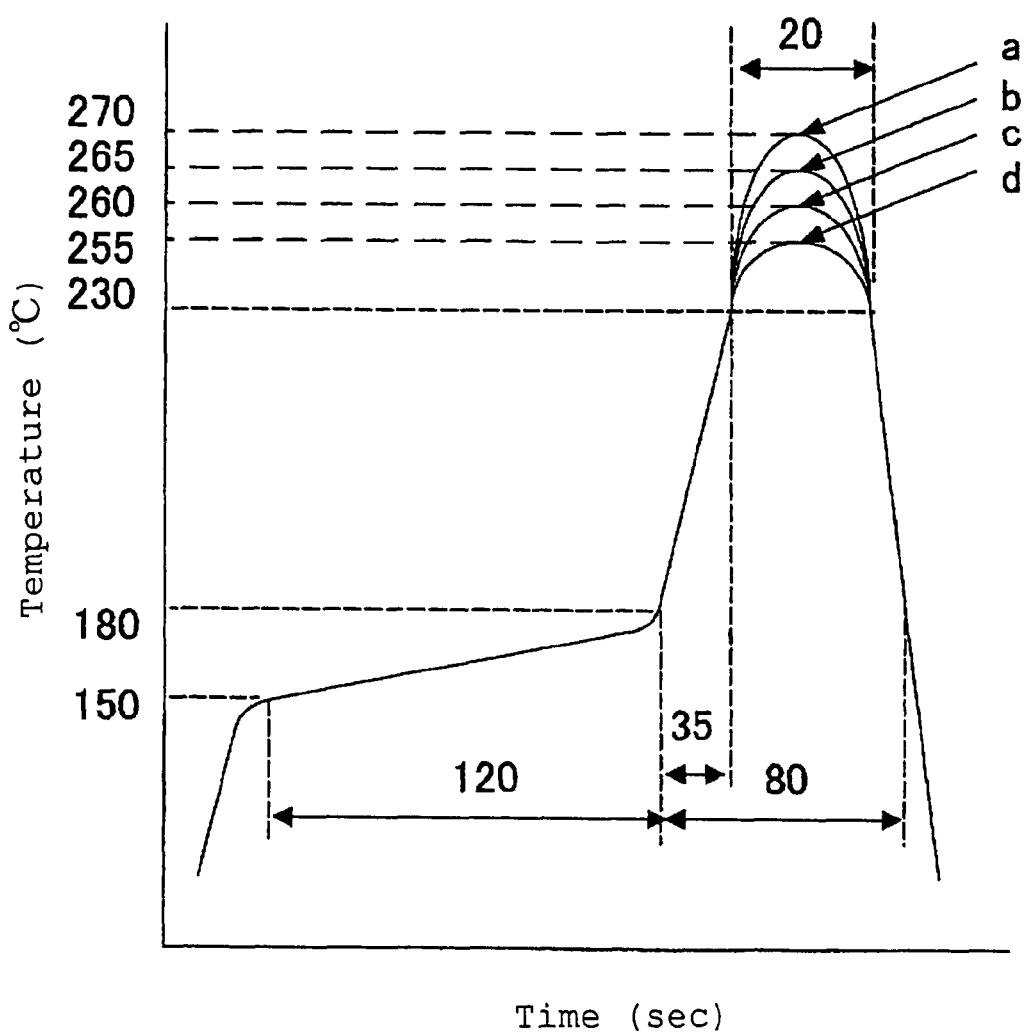
FIG. 1 is a view showing a relationship between temperature and time in a reflow step of a reflow heat resistance test that is carried out in the examples and the comparative examples of the present invention.

DESCRIPTION OF SYMBOLS a: reflow step heating temperature 270° C.
b: reflow step heating temperature 265° C.
c: reflow step heating temperature 260° C.
d: reflow step heating temperature 255° C.

BEST MODE FOR CARRYING OUT THE INVENTION

The present invention is described in detail hereinafter.

Polyamide Resin (A)

The polyamide resin (A) of the present invention comprises polyfunctional carboxylic acid component units (a-1) and polyfunctional amine component units (a-2).

Polyfunctional Carboxylic Acid Component Units (a-1)

The polyfunctional carboxylic acid component units (a-1) to constitute the polyamide (A) for use in the present invention preferably comprise 30 to 100% by mol of terephthalic acid component units, and 0 to 70% by mol of component units of an aromatic polyfunctional carboxylic acid other than terephthalic acid and/or 0 to 70% by mol of component units of an aliphatic polyfunctional carboxylic acid of 4 to 20 carbon atoms. Examples of the component units of aromatic carboxylic acids other than terephthalic acid include isophthalic acid, 2-methylterephthalic acid, naphthalenedicarboxylic acid, phthalic anhydride, trimellitic acid, pyromellitic acid, trimellitic anhydride and pyromellitic anhydride. Of these, isophthalic acid is particularly preferable. Further, they may be used singly or in combination of two or more kinds. When a trifunctional or higher polyfunctional compound is used, the amount thereof needs to be such an amount that the resin does not gel, more specifically, not more than 10% by mol in 100% by mol of the total of all the carboxylic acid component units.

When the aliphatic polyfunctional carboxylic acid component is introduced, it is preferably an aliphatic polyfunctional carboxylic acid compound of 4 to 20 carbon atoms, preferably 6 to 12 carbon atoms, more preferably 6 to 10 carbon atoms. Examples of such compounds include adipic acid, suberic acid, azelaic acid, sebacic acid, decanedicarboxylic acid, undecanedicarboxylic acid and dodecanedicarboxylic acid. Of these, adipic acid is particularly preferable from the viewpoint of improvement of mechanical properties. In addition, a trifunctional or higher polyfunctional carboxylic acid compound can be used when necessary, but the amount thereof should be limited to such an amount that the resin does not gel, more specifically, not more than 10% by mol in 100% by mol of the total of all the carboxylic acid component units.

In the present invention, it is desirable that the terephthalic acid component units are contained in amounts of 30 to 100% by mol, preferably 40 to 100% by mol, more preferably 50 to 70% by mol, based on 100% by mol of the total of the polyfunctional carboxylic acid component units, and the component units of an aromatic polyfunctional carboxylic acid other than terephthalic acid are contained in amounts of 0 to 70% by mol, preferably 0 to 25% by mol, more preferably 0 to 10% by mol, based on 100% by mol of the total of the polyfunctional carboxylic acid component units. As the amount of the aromatic polyfunctional carboxylic acid component other than terephthalic acid is decreased, crystallinity of the polyamide resin becomes higher, and therefore, mechanical properties of the molded article, particularly toughness, tend to become higher. The component units of an aliphatic polyfunctional carboxylic acid of 4 to 20 carbon atoms are desirably contained in amounts of 0 to 70% by mol, preferably 0 to 60% by mol, more preferably 20 to 60% by mol.

Polyfunctional Amine Component Units (a-2)

The polyfunctional amine component units (a-2) to constitute the polyamide resin (A) for use in the present invention are, for example, component units of a polyfunctional amine having linear or branched chain of 4 to 25 carbon atoms, preferably 6 to 12 carbon atoms.

Examples of linear chain polyfunctional amine component units include 1,4-diaminobutane, 1,6-diaminohexane, 1,7-diaminoheptane, 1,8-diaminooctane, 1,9-diaminononane, 1,10-diaminodecane, 1,11-diaminoundecane and 1,12-diaminododecane. Of these, 1,6-diaminohexane is preferable.

Examples of component units of linear chain aliphatic diamines having branched chain include 2-methyl-1,5-diaminopentane, 2-methyl-1,6-diaminohexane, 2-methyl-1,7-diaminoheptane, 2-methyl-1,8-diaminooctane, 2-methyl-1,9-diaminononane, 2-methyl-1,10-diaminodecane and 2-methyl-1,11-diaminoundecane. Of these, 2-methyl-1,5-diaminopentane and 2-methyl-1,8-diaminooctane are preferable.

Examples of alicyclic polyfunctional amine component units include component units derived from alicyclic diamines, such as 1,3-diaminocyclohexane, 1,4-diaminocyclohexane, 1,3-bis(aminomethyl)cyclohexane, 1,4-bis(aminomethyl)cyclohexane, isophoronediamine, piperazine, 2,5-dimethylpiperazine, bis(4-aminocyclohexyl)methane, bis(4-aminocyclohexyl)propane, 4,4'-diamino-3,3'-dimethyldicyclohexylpropane, 4,4'-diamino-3,3'-dimethyldicyclohexylmethane, 4,4'-diamino-3,3'-dimethyl-5,5'-dimethyldicyclohexylmethane, 4,4'-diamino-3,3'-dimethyl-5,5'-dimethyldicyclohexylpropane, α,α'-bis(4-aminocyclohexyl)-p-diisopropylbenzene, α,α'-bis(4-aminocyclohexyl)-m-diisopropylbenzene, α,α'-bis(4-aminocyclohexyl)-1,4-cyclohexane and α,α'-bis(4-aminocyclohexyl)-1,3-cyclohexane. Of the alicyclic diamine component units, preferable are component units derived from alicyclic diamines, such as 1,3-diaminocyclohexane, 1,4-diaminocyclohexane, bis(aminomethyl)cyclohexane, bis(4-aminocyclohexyl)methane and 4,4'-diamino-3,3'-dimethyldicyclohexylmethane, and particularly preferable are component units derived from alicyclic diamines, such as 1,3-diaminocyclohexane, 1,4-diaminocyclohexane, bis(4-aminocyclohexyl)methane, 1,3-bis(aminocyclohexyl)methane and 1,3-bis(aminomethyl)cyclohexane. When a trifunctional or higher polyfunctional compound is used, the amount thereof needs to be such an amount that the resin does not gel, more specifically, not more than 10% by mol in 100% by mol of the total of all the amine component units.

Preparation of Polyamide Resin (A)

For preparing the polyamide resin (A) for use in the present invention, any of publicly known processes is adoptable. In general, the polyamide resin (A) can be prepared by mixing the above-described polyfunctional amine component with the polyfunctional carboxylic acid component and heating the mixture in the presence of a catalyst. In this reaction, it is preferable to blend the polyfunctional amine component with the polyfunctional carboxylic acid component in such a manner that the total number of moles of the polyfunctional amine component is larger than the total number of moles of the polyfunctional carboxylic acid component, and it is particularly preferable that the amounts of all the polyfunctional amine components are in the range of 100 to 120 equivalents based on 100 equivalents of all the polyfunctional carboxylic acid components. This reaction is usually carried out in an atmosphere of an inert gas, and in general, the reaction vessel is purged with an inert gas such as a nitrogen gas. In order to control the polycondensation reaction for obtaining polyamide, it is desirable to enclose water in advance, and organic solvents that are soluble in water, e.g., alcohols such as methanol and ethanol, may be contained.

Examples of the catalysts employable in the preparation of the polyamide resin (A) for use in the present invention include phosphoric acid, its salts and its ester compounds; phosphorous acid, its salts and its ester compounds; and hypophosphorous acid, its salts and its ester compounds. Of these, sodium phosphate, sodium phosphite, potassium hypophosphite and sodium hypophosphite are preferable. These phosphorus compounds can be used singly or in combination. Such a phosphorus compound is used in an amount of usually 0.01 to 5 mol, preferably 0.05 to 2 mol, based on 100 mol of the polyfunctional carboxylic acid.

In order to prepare the polyamide resin (A) for use in the present invention, an end-capper is preferably used. Examples of the end-cappers employable herein include benzoic acid, alkali metal salts of benzoic acid, and acetic acid. Such an end-capper is used in an amount of usually 0.1 to 5 mol, preferably 0.5 to 2 mol, based on 100 mol of the polyfunctional carboxylic acid. By controlling the amount of the end-capper used, the intrinsic viscosity [η] of the resulting polycondensate can be controlled.

The reaction conditions in the preparation of the polycondensate are specifically as follows. The reaction temperature is in the range of usually 200 to 290° C., preferably 220 to 280° C., and the reaction time is in the range of usually 0.5 to 5 hours, preferably 1 to 3 hours. Although any pressure conditions of atmospheric pressure conditions to positive pressure conditions are adoptable in the invention, it is preferable to carry out the reaction under positive pressure, and the reaction pressure is set at usually 2 to 5 MPa, preferably 2.5 to 4 MPa.

By carrying out the polycondensation reaction in the above manner, a low condensate having an intrinsic viscosity [η], as measured in 96.5% sulfuric acid at 25° C. using an Ubbelohode viscometer, of usually 0.05 to 0.6 dl/g, preferably 0.08 to 0.3 dl/g, can be obtained. The polyamide low condensate thus produced in an aqueous medium is separated from the reaction solution. For separating the polyamide low condensate from the reaction solution, a method of filtration, centrifugal separation or the like is adoptable, but a method in which the reaction solution containing the polyamide low condensate produced is flushed into air through a nozzle to perform solid-liquid separation is efficient.

In a preferred embodiment of the process for preparing the polyamide resin (A) for use in the present invention, the polyamide low condensate obtained as above is further subjected to postpolymerization. It is preferable that the polyamide low condensate is dried and then heated to be molten and the resulting melt is subjected to the postpolymerization with giving shear stress. For this reaction, the polyamide low condensate is heated to a temperature at which the dry polyamide low condensate is at least molten. In general, the polyamide low condensate is heated to a temperature of not lower than the melting point of the dry polyamide low condensate, preferably a temperature higher than the melting point by 10 to 60° C. The shear stress can be given to the melt by the use of, for example, a vented twin-screw extruder or a kneader. By giving shear stress to the melt in this manner, the dry polyamide low condensate in the molten state undergoes polycondensation, and besides, polycondensation reaction of a condensate also proceeds.

In another preferred embodiment of the process for preparing the polyamide resin (A) for use in the present invention, the polyamide low condensate obtained as above is further subjected to solid phase polymerization. That is to say, the polyamide low condensate obtained as above is subjected to solid phase polymerization by a publicly known, publicly worked process, whereby a polyamide having an intrinsic viscosity [η], as measured in the above manner, of 0.5 to 2 dl/g can be prepared.

In another preferred embodiment of the process for preparing the polyamide resin (A) for use in the present invention, the polyamide low condensate obtained as above is subjected to solid phase polymerization and then further subjected to melt polymerization. That is to say, the polyamide low condensate obtained as above is subjected to solid phase polymerization by a publicly known, publicly worked process to prepare a polyamide precursor having an intrinsic viscosity [η] in the range of 0.5 to 1.2 dl/g, and the precursor is subjected to melt polymerization to increase the intrinsic viscosity [η] in the range of 0.7 to 2 dl/g. When the intrinsic viscosity is in this range, a polyamide resin having excellent fluidity and excellent toughness can be obtained.

The polyamide resin (A) for use in the present invention has a melting point because it is crystalline, and in the case where the polyamide resin obtained by the above process is heated at a rate of 10° C./min by a differential scanning calorimeter (DSC) and the endothermic peak based on melting of the polyamide resin in this heating is taken as a melting point (Tm), the melting point (Tm) is in the range of preferably 280 to 340° C., particularly preferably 300 to 340° C. The polyamide resin (A) having a melting point in this range exhibits particularly excellent heat resistance. When the melting point is not lower than 280° C., preferably not lower than 300° C., particularly preferably not lower than 315° C., sufficient heat resistance can be obtained in a reflow soldering step, particularly in a recent reflow soldering step using a high-melting point lead-free solder. On the other hand, when the melting point is not higher than 340° C., this melting point is lower than 350° C. that is a decomposition point of the polyamide resin, so that foaming and generation of a decomposition gas do not take place in the melt molding process, and sufficient heat stability can be obtained.

The polyamide resin (A) for use in the present invention is desirably added so that the amount of the polyamide resin (A) should become 20 to 80% by mass, preferably 30 to 60% by mass, more preferably 35 to 50% by mass, in 100% by mass of the total of the polyamide resin (A), the flame retardant (B), the antimony compound (C), the salt of zinc or calcium (D) and the reinforcement (E).

Flame Retardant (B)

The flame retardant (B) for use in the present invention is added for the purpose of lowing flammability of the resin. As the flame retardant (B), a publicly known flame retardant is employable, and an organic flame retardant is preferable. Of such organic flame retardants, halogen-based flame retardants, particularly bromine-containing compounds, can be preferably used.

In particular, polybrominated styrene, brominated polystyrene and brominated polyphenylene ether resins containing bromine in an amount of 50 to 80% by mass, preferably 60 to 70% by mass, can be preferably used as the flame retardants from the viewpoints that they exert a high flame retarding effect in a small amount and they are hardly thermally decomposed even under the molding conditions of not lower than 280° C.

The polybrominated styrene resin is prepared by polymerizing brominated styrene or brominated α-methylstyrene, and examples of the monomers include dibromostyrene, tribromostyrene, pentabromostyrene and tribromo-α-methylstyrene. These monomers can be used singly or in combination of two or more kinds. Further, brominated styrene and a (meth)acrylic acid ester compound having an epoxy group may be copolymerized, or an unsaturated carboxylic acid or its derivative may be graft copolymerized.

In the polybrominated styrene which is obtained by brominating at least a part of hydrogen atoms for constituting an aromatic ring of styrene or α-methylstyrene that is a raw material monomer and then performing polymerization as above, bromine atoms having been substituted for hydrogen atoms bonded to carbon atoms for forming the aromatic ring are present in the polymer, and hydrogen atoms for forming the alkyl chain that forms a main skeleton of this polymer have not been substantially substituted for bromine atoms.

On the other hand, the brominated polystyrene resin is one prepared by brominating polystyrene or poly-α-methylstyrene and differs from the above-mentioned polybrominated styrene resin. The brominated polystyrene is obtained by polymerizing styrene or α-methylstyrene that is a raw material to prepare polystyrene and then brominating the polystyrene. Thus, the brominated polystyrene is obtained by the use of a raw material and a production process different from those of the polybrominated styrene. The polybrominated styrene and the brominated polystyrene are generally represented by the following formula (1):

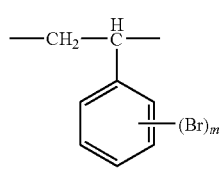

(1)

wherein m is an integer of 1 to 5.

That is to say, the brominated polystyrene is obtained by polymerizing styrene represented by the following chemical formula (2) that is a raw material and then brominating the reaction product.

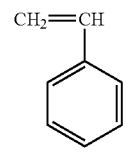

(2)

On the other hand, the polybrominated styrene is obtained by polymerizing brominated styrene represented by the following formula (3):

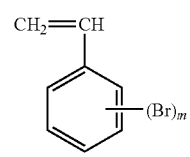

(3)

wherein m is an integer of 1 to 5.

The polybrominated styrene resin and the brominated polystyrene resin for use in the present invention have a bromine content of 50 to 80% by mass, preferably 60 to 70% by mass, and have a weight-average molecular weight (Mw), as determined in terms of polystyrene by GPC (gel permeation chromatography) at a column temperature of 40° C. using chloroform as a mobile phase and using a differential refractometer detector, of 1,000 to 400,000, preferably 2,000 to 100,000, more preferably 2,000 to 60,000. It is preferable to use the polybrominated styrene resin or the brominated polystyrene resin having the above molecular weight in the flame-retardant polyamide composition of the present invention, because thin-wall fluidity is improved.

The brominated polyphenylene ether resin for use in the present invention is represented by the following formula (4).

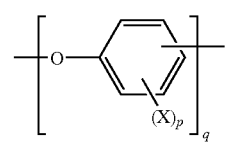

(4)

In the formula (4), X is Br, p is a number of 1 to 4, the lower limit of q is 1, preferably 2, more preferably 5, and the upper limit of q is 10, preferably 20, more preferably 40, still more preferably 60, still more preferably 80, particularly preferably 100. Examples of the brominated polyphenylene ether resins represented by the formula (4) include polydibromo-p-phenylene oxide, polytribromo-p-phenylene oxide, polybromo-p-phenylene oxide and polydibromo-o-phenylene oxide.

The above flame retardants can be selected from commercially available ones, and can be also used in combination of two or more kinds. From the viewpoint of excellent molding stability at higher temperatures, the brominated polystyrene resin and the polybrominated styrene resin are preferable, and the polybrominated styrene resin is more preferable.

The flame retardant (B) for use in the present invention is desirably added so that the amount of the flame retardant (B) should become 5 to 40% by mass, preferably 10 to 30% by mass, more preferably 15 to 30% by mass, in 100% by mass of the total of the polyamide resin (A), the flame retardant (B), the antimony compound (C), the salt of zinc or calcium (D) and the reinforcement (E).

Antimony Compound (C)

Examples of the antimony compounds (C) used as flame retardant assistants in the present invention include antimony trioxide, antimony pentaoxide, antimony tetraoxide and sodium antimonate. From the viewpoint of heat stability in the molding process, sodium antimonate is preferable.

The antimony compound (C) for use in the present invention is desirably added so that the amount of the antimony compound (C) should become 0.01 to 0.45% by mass, preferably 0.1 to 0.4% by mass, more preferably 0.15 to 0.4% by mass, in 100% by mass of the total of the polyamide resin (A), the flame retardant (B), the antimony compound (C), the salt of zinc or calcium (D) and the reinforcement (E).

Salt of Zinc or Calcium (D)

Examples of the salts of zinc or calcium (D) used as flame retardant assistants in the present invention include zinc borate, zinc stannate, zinc phosphate, calcium borate and calcium molybdate. Of these, preferable are zinc borate and zinc phosphate, and more preferable is zinc borate. The zinc borate is, for example, $2ZnO.3B_2O_3$, $4ZnO.B_2O_3.H_2O$ or $2ZnO.3B_2O_3.5H_2O$. Preferable is $2ZnO.3B_2O_3$ or $4ZnO.B_2O_3.H_2O$, and more preferable is $2ZnO.3B_2O_3$ that is an anhydride of zinc borate.

The zinc or calcium salt (D) for use in the present invention is desirably added so that the amount of the zinc or calcium salt (D) should become 0.5 to 10% by mass, preferably 1 to 5% by mass, more preferably 1 to 3% by mass, in 100% by mass of the total of the polyamide resin (A), the flame retardant (B), the antimony compound (C), the salt of zinc or calcium (D) and the reinforcement (E).

In the present invention, by using a specific amount of the antimony compound (C) and a specific amount of the salt of zinc or calcium (D) in combination, the UL94 V-0 standard is attained in a small amount of a flame retardant, and the quantity of a decomposition gas generated and the quantity of discolored matters in the molded article are reduced even under high temperature molding conditions of not lower than 280° C. Consequently, the aforesaid problems can be solved.

The antimony compound (C) and the salt of zinc or calcium (D) are desirably added so that the total amount of the components (C) and (D) should become 1 to 5% by mass, preferably 1 to 4% by mass, more preferably 1 to 3.5% by mass, in 100% by mass of the total of the polyamide resin (A), the flame retardant (B), the antimony compound (C), the salt of zinc or calcium (D) and the reinforcement (E).

Reinforcement (E)

In the present invention, the reinforcement (E) may be used when necessary, and as the reinforcements, various inorganic fillers having shapes of fiber, powder, grain, plate, needle, cloth, mat and the like are employable. In more detail, there can be mentioned powdery or plate inorganic compounds, such as silica, silica-alumina, alumina, calcium carbonate, titanium dioxide, talc, wollastonite, diatomaceous earth, clay, kaolin, spherical glass, mica, gypsum, red iron oxide, magnesium oxide and zinc oxide; needle inorganic compounds, such as potassium titanate; inorganic fibers, such as glass fiber, potassium titanate fiber, metal-coated glass fiber, ceramic fiber, wollastonite, carbon fiber, metal carbide fiber, metal curing product fiber, asbestos fiber and boron fiber; and organic fibers, such as aramid fiber and carbon fiber. As the fibrous filler, glass fiber is particularly preferable. By the use of glass fiber, moldability of the composition is enhanced, and besides, mechanical properties, such as tensile strength, flexural strength and flexural modulus, and heat resistance properties, such as heat distortion temperature, of a molded article produced from the polyamide composition are improved. The mean length of such glass fibers is in the range of usually 0.1 to 20 mm, preferably 0.3 to 6 mm, and the aspect ratio (L (mean length of fibers)/D (mean outer diameter of fibers)) is in the range of usually 10 to 5000, preferably 2000 to 3000. It is preferable to use glass fibers having a mean length and an aspect ratio in the above ranges.

The above fillers can be also used by mixing two or more kinds. Further, the fillers can be used after treated with silane coupling agents, titanium coupling agents or the like. For example, they can be surface-treated with silane compounds, such as vinyltriethoxysilane, 2-aminopropyltriethoxysilane and 2-glycidoxypropyltriethoxysilane.

The fibrous filler in the reinforcement (E) of the present invention may have been coated with a binder. As such binders, acrylic compounds, acrylic/maleic acid modified compounds, epoxy compounds, urethane compounds, urethane/maleic acid modified compounds and urethane/amine modified compounds are preferably used. The surface-treating agent and the binder may be used in combination. By using them in combination, binding property of the fibrous filler to other components in the composition of the invention is enhanced, and appearance and strength properties are also enhanced.

The reinforcement (E) is desirably added so that the amount of the reinforcement (E) should become 0 to 60% by mass, preferably 10 to 50% by mass, more preferably 15 to 45% by mass, in 100% by mass of the total of the polyamide resin (A), the flame retardant (B), the antimony compound (C), the salt of zinc or calcium (D) and the reinforcement (E).

Other Additives

The flame-retardant polyamide composition of the present invention may contain, in addition to the above components, publicly known various additives other than the above components, such as heat stabilizer, weathering stabilizer, fluidity improver, plasticizer, thickener, antistatic agent, mold release agent, pigment, dye, inorganic or organic filler, nucleating agent, fibrous reinforcing agent and inorganic compound (e.g., carbon black, talc, clay, mica), within limits not detrimental to the object of the present invention. In the present invention, additives such as a halogen trapping agent usually used are also employable. A known halogen trapping agent is, for example, hydrotalcite. Especially by adding the fibrous reinforcing agent of the above additives, the flame-retardant polyamide composition of the present invention is much more enhanced in heat resistance, incombustibility, rigidity, tensile strength, flexural strength and impact strength.

The flame-retardant polyamide composition of the present invention may further contain other polymers within limits not detrimental to the object of the present invention, and examples of such polymers include polyolefins, such as polyethylene, polypropylene, poly-4-methyl-1-pentene, ethylene/1-butene copolymer, propylene/ethylene copolymer, propylene/1-butene copolymer and polyolefin elastomer, polystyrene, polyamide, polycarbonate, polyacetal, polysulfone, polyphenylene oxide, fluororesin, silicone resin, PPS, LCP and Teflon (registered trademark). In addition, modified products of polyolefins are also employable, and examples thereof include modified polyethylene wherein polyethylene is modified with carboxyl group, acid anhydride group, amino group or the like, modified aromatic vinyl compound/conjugated diene copolymers or hydrogenation products thereof, such as modified SEBS, and modified polyolefin elastomers, such as modified ethylene/propylene copolymer.

Process for Preparing Flame-Retardant Polyamide Composition

For preparing the flame-retardant polyamide composition of the present invention, a publicly known resin kneading method is adopted. For example, a method in which the components are mixed by a Henschel mixer, a V-type blender, a ribbon blender, a tumbling blender or the like, or a method in which after the mixing, the mixture is melt kneaded by a single screw extruder, a multi-screw extruder, a kneader, a Banbury mixer or the like and then further subjected to granulation or pulverization is adoptable.

Flame-Retardant Polyamide Composition

The flame-retardant polyamide composition of the present invention desirably contains the polyamide resin (A) in an amount of 20 to 80% by mass, preferably 30 to 60% by mass, more preferably 35 to 50% by mass, in 100% by mass of the total of the polyamide resin (A), the flame retardant (B), the antimony compound (C), the salt of zinc or calcium (D) and the reinforcement (E).

When the amount of the polyamide resin (A) in the flame-retardant polyamide composition is not less than 20% by mass, mechanical properties, particularly toughness, can be imparted to the resulting molded product, and when the amount thereof is not more than 80% by mass, the flame retardant, the antimony compound and the salt of zinc or calcium can be contained, so that it becomes possible to obtain sufficient incombustibility.

The flame-retardant polyamide composition of the present invention desirably contains the flame retardant (B) in an amount of 5 to 40% by mass, preferably 10 to 30% by mass, more preferably 15 to 30% by mass. When the content of the flame retardant (B) is not less than 5% by mass, sufficient incombustibility can be imparted to the polyamide resin, and when the content thereof is not more than 40% by mass, mechanical properties of the molded article, such as toughness, are not impaired.

The flame-retardant polyamide composition of the present invention desirably contains the antimony compound (C) in an amount of 0.01 to 0.45% by mass, preferably 0.1 to 0.4% by mass, more preferably 0.15 to 0.4% by mass. When the content of the antimony compound (C) is not less than 0.01% by mass, sufficient incombustibility can be obtained, and when the content thereof is not more than 0.45% by mass, problems such as increase in quantity of a gas generated in the molding process and formation of discolored matters in the molded article do not occur.

The flame-retardant polyamide composition of the present invention desirably contains the salt of zinc or calcium (D) in an amount of 0.5 to 10% by mass, preferably 1 to 5% by mass, more preferably 1 to 3% by mass. When the content of the salt of zinc or calcium (D) is not less than 0.5% by mass, sufficient incombustibility can be obtained, so that such a content is preferable. When the content thereof is not more than 10% by mass, mechanical properties of the resulting molded article, especially toughness, are not impaired, so that such a content is preferable. In the present invention, by using the antimony compound (C) and the salt of zinc or calcium (D) in combination, the UL94 V-0 standard is attained in a small amount of a flame retardant, and the quantity of a decomposition gas generated and the quantity of discolored matters in the molded article can be reduced even under high temperature molding conditions of not lower than 280° C. In the flame-retardant polyamide composition of the present invention, the antimony compound (C) and the salt of zinc or calcium (D) are desirably contained in the total amount of 1 to 5% by mass, preferably 1 to 4% by mass, more preferably 1 to 3.5% by mass. When the total amount of the antimony compound (C) and the salt of zinc or calcium (D) is not less than 1% by mass, sufficient incombustibility can be obtained. When the total amount thereof is not more than 5% by mass, mechanical properties of the resulting molded article, such as toughness, are not impaired, and therefore, such an amount is preferable.

The reinforcement (E) is desirably added so that the amount of the reinforcement (E) should become 0 to 60% by mass, preferably 10 to 50% by mass, more preferably 15 to 45% by mass. When the content of the reinforcement (E) is not more than 60% by mass, surface appearance of the resulting molded article is not impaired, and therefore, such a content is preferable.

In the flammability evaluation in accordance with the UL94 Standard, the flame-retardant polyamide composition of the present invention is evaluated as V-0. The quantity of a bromine gas generated in the molding process is not more than 80 ppm, preferably 0 to 50 ppm, more preferably 0 to 10 ppm, particularly preferably 0.1 to 5 ppm; the reflow heat resistance temperature after moisture absorption is not lower than 255° C., preferably 260 to 280° C.; the breaking energy that becomes an indication of mechanical properties, i.e., toughness, is in the range of 45 to 100 ml, preferably 50 to 80 mJ, more preferably 52 to 75 mJ; and the flow length is in the range of 40 to 150 mm, preferably 60 to 130 mm, more preferably 70 to 100 mm. Thus, the flame-retardant polyamide composition of the present invention has extremely excellent features, and is a material having excellent incombustibility, high toughness, melt fluidity, heat resistance and molding stability which are required for surface mounting, so that the composition is favorably used for electrical and electronic parts.

Molded Article and Electrical or Electronic Part

The flame-retardant polyamide composition of the present invention can be molded into various molded articles by using publicly known molding processes, such as compression molding, injection molding and extrusion molding.

Further, the flame-retardant polyamide composition of the present invention is excellent in molding stability, heat resistance and mechanical properties, and can be applied to uses in a field requiring these properties or a field of precision molding. More specifically, there can be mentioned various molded articles, e.g., electrical and electronic parts, such as electrical equipment for automobiles, circuit breaker, connector and LED reflecting material, coil bobbins and housings.

EXAMPLES

The present invention is further described with reference to the following examples, but it should be construed that the invention is in no way limited to those examples. In the following examples and comparative examples, measurements of properties and evaluation thereof were carried out in the following manner.

Intrinsic Viscosity [η]

In 50 ml of a 96.5% sulfuric acid solution, 0.5 g of a polyamide resin was dissolved to prepare a sample solution. Using an Ubbelohde viscometer, falling time (sec) of the sample solution was measured under the temperature conditions of 25±0.05° C., and the intrinsic viscosity [η] was calculated from the following formula.

$$[\eta]=\eta SP/[C(1+0.205\eta/SP), \eta SP=(t-t0)/t0$$

[η]: intrinsic viscosity (dl/g), ηSP: specific viscosity, C: sample concentration (g/dl), t: falling time (sec) of sample solution, t0: falling time (sec) of blank sulfuric acid.

Melting Point (Tm)

Using a Perkin Elmer DSC7, a sample was temporarily held at 330° C. for 5 minutes, then cooled down to 23° C. at a rate of 10° C./min and then heated at a rate of 10° C./min to perform measurement. The endothermic peak based on the melting in this case was taken as a melting point.

Flammability Test

A test specimen of 1/32 inch×1/2 inch×5 inches, which had been prepared by injection molding, was subjected to a vertical flame test in accordance with UL94 Standard (UL test No. UL94 dated Jun. 18, 1991), to evaluate incombustibility.

Further, 5 test specimens were each brought into contact with flame twice (total: 10 times), and after completion of each contact with flame, the total of flaming time was measured and a test specimen having a shorter flaming time is evaluated as one having more excellent incombustibility. In order to obtain evaluation of V-0 in the UL94, the standard of the total of the flaming time is not more than 50 seconds.

Molding machine: Sodick Plustech Co., Ltd., Tuparl TR40S3A

Molding machine cylinder temperature: melting point of each polyamide resin+10° C.

Mold temperature: 120° C.

Reflow Heat Resistance Test

A test specimen having a length of 64 mm, a width of 6 mm and a thickness of 0.8 mm, which had been prepared by injection molding, was subjected to moisture conditioning for 96 hours at a temperature of 40° C. and a relative humidity of 95%.

Molding machine: Sodick Plustech Co., Ltd., Tuparl TR40S3A

Molding machine cylinder temperature: melting point of each polyamide resin+10° C.

Mold temperature: 100° C.

Using an air reflow soldering device (AIS-20-82-C manufactured by Eightech Tectron Co., Ltd.), reflow step in a temperature profile shown in FIG. 1 was carried out.

That is to say, a test specimen having been subjected to the above moisture conditioning was placed on a glass epoxy substrate having a thickness of 1 mm, and a temperature sensor was set on the substrate to measure a temperature profile. In the case where the temperature was raised up to 230° C. at a given rate, then raised up to a given temperature (a: 270° C., b: 265° C., c: 260° C., d: 255° C.) in 20 seconds and then lowered down to 230° C., as shown in FIG. 1, a maximum value of the temperatures at which the test specimen was not melted and no blister occurred on the surface of the test specimen was determined, and this maximum value of the temperatures was taken as a reflow heat resistance temperature. In general, the reflow heat resistance temperature of a test specimen that has absorbed moisture tends to be inferior to that of a test specimen in the absolute dry state. Further, as the quantity ratio of polyamide/flame retardant is lowered, the reflow heat resistance temperature tends to become lower.

Flexural Test (Toughness)

A test specimen having a length of 64 mm, a width of 6 mm and a thickness of 0.8 mm, which had been prepared by injection molding, was subjected to flexural test under the conditions of a span of 26 mm and a flexural rate of 5 mm/min using a flexural test machine AB5 manufactured by NTESCO, to measure energy (toughness) required for breaking the test specimen.

Molding machine: Sodick Plustech Co., Ltd., Tuparl TR40S3A

Molding machine cylinder temperature: melting point of each polyamide resin+10° C.

Mold temperature: 100° C.

Flow Length Test (Fluidity)

Using a bar-flow mold having a width of 10 mm and a thickness of 0.5 mm, injection was carried out under the following conditions to measure a flow length (mm) of the resin in the mold.

Injection molding machine: Sodick Plustech Co., Ltd., Tuparl TR40S3A

Injection pressure preset value: 2000 kg/cm$^2$

Cylinder preset temperature: melting point of each polyamide resin+10° C.

Mold temperature: 120° C.

Residence Stability Test

A flame-retardant polyamide composition was held in a molding machine in a unit time of 60 seconds under the cylinder temperature conditions of 330° C., and thereafter, injection molding in a mold for the aforesaid flexural test specimen was carried out. A period of time at the end of which formation of discolored matter or black carbide was confirmed on the resulting molded article was recorded.

Separately from the above test, a flame-retardant polyamide composition was held for 600 seconds, then the molding machine nozzle was detached from the mold, and occurrence of resin drooling or foaming was visually observed. Then, evaluation was carried out based on the following criteria.

AA: Drooling and foaming of the resin are not observed.

BB: Drooling of the resin occurs.

CC: The resin is decomposed and foamed.

If the resin is decomposed and the quantity of a gas generated is increased, drooling and foaming become worse.

Molding machine: Sodick Plustech Co., Ltd., Tuparl TR40S3A

Molding machine cylinder temperature: 330° C.

Mold temperature: 100° C.

Proportion Defective of Manufactured Articles

Using a two-impression/1-shot 80-pole connector mold, each flame-retardant polyamide composition was subjected to 2000-shot continuous molding under the cylinder temperature conditions of 330° C. The appearance of the resulting molded articles was visually observed. A molded article on which discoloration and black carbide of more than 0.2 mm were observed was judged to be a defective, and proportion defective of the manufactured articles was calculated from the following calculation formula.

Proportion defective (%)=number of defectives/(2000× 2)×100

Molding machine: Sodick Plustech Co., Ltd., Tuparl TR40S3A

Molding machine cylinder temperature: 330° C.

Mold temperature: 120° C.

Measurement of Quantity of Bromine Gas Generated

In a closed quartz tube, 1.0 g of a flame-retardant polyamide composition was heated at a temperature of 330° C. for 30 minutes in an atmosphere of an argon gas by the use of a heating gas generator, then the gas generated was trapped in a hydrazine aqueous solution, and the quantity of a bromine gas was measured by ion chromatography.

In the examples and the comparative examples, the following components were used as the polyamide resin (A), the flame retardant (B), the antimony compound (C), the salt of zinc or calcium (D) and the reinforcement (E).

Polyamide Resin (A)
  Polyamide Resin (A-1)
    Constitution: dicarboxylic acid component units (terephthalic acid: 62.5% by mol, adipic acid: 37.5% by mol), diamine component units (1,6-diaminohexane: 100% by mol)
    Intrinsic viscosity [η]: 0.8 dl/g
    Melting point: 320° C.
  Polyamide Resin (A-2)
    Constitution: dicarboxylic acid component units (terephthalic acid: 62.5% by mol, adipic acid: 37.5% by mol), diamine component units (1,6-diaminohexane: 100% by mol)
    Intrinsic viscosity [η]: 1.0 dl/g
    Melting point: 320° C.
  Polyamide Resin (A-3)
    Constitution: dicarboxylic acid component units (terephthalic acid: 55% by mol, adipic acid: 45% by mol), diamine component units (1,6-diaminohexane: 100% by mol)
    Intrinsic viscosity [η]: 0.8 dl/g
    Melting point: 310° C.
  Polyamide Resin (A-4)
    Constitution: dicarboxylic acid component units (terephthalic acid: 100% by mol), diamine component units (1,9-nonanediamine: 82% by mol, 2-methyl-1,8-octanediamine: 18% by mol)
    Intrinsic viscosity [η]: 1.0 dl/g
    Melting point: 315° C.

Flame Retardant (B)
  Using gel permeation chromatography (GPC), weight-average molecular weight of each flame retardant was measured under the following conditions.
    Measuring device: Shodex GPC SYSTEM-21
    Column: Shodex GPC K-G+K−806 L+K−806 L
    Column temperature: 40° C.
  Mobile phase: chloroform
    Detector: differential refractometer
    Flow rate: 1.0 ml/min
    Weight-average molecular weight: in terms of polystyrene
  Flame Retardant (B-1)
  Polybrominated styrene: PBS64-HW available from GLC K.K.
    Bromine content: 64% by mass
    Weight-average molecular weight: 26,000
  Flame Retardant (B-2)
  Brominated polystyrene: PRF-1200ZEX available from Manac Incorporated
    Bromine content: 68% by mass
    Weight-average molecular weight: 125,000

Antimony Compound (C)
  Sodium antimonate: SA-A available from Nihon Seiko Co., Ltd.

Salt of Zinc or Calcium (D)
  Salt of Zinc or Calcium (D-1)
    Zinc borate: FIREBREAK 500 ($2ZnO.3B_2O_3$) available from US Borax Inc.
  Salt of Zinc or Calcium (D-2)
    Zinc borate: FIREBREAK 415 ($4ZnO.3B_2O_3.H_2O$) available from US Borax Inc.

Reinforcement (E)
  Glass fiber: ECS03-615 available from Central Glass Co., Ltd.

In addition to the above components, 1.4 parts by mass of maleated SEBS (available from Asahi Chemical Industry Co., Ltd., trade name: Toughtech M1913), 0.3 part by mass of hydrotalcite (available from Kyowa Chemical Industry Co., Ltd., trade name: DHT-4C), 0.3 part by mass of a wax (available from Clariant Japan K.K., trade name: Hostamont CAV102) and 0.7 part by mass t of talc (available from Matsumura Sangyo Co., Ltd., trade name: Hifiller #100 Clay 95) were added as drip inhibitors for the purpose of preventing dripping of the resin caused by liquefaction due to melting in the flaming.

Examples 1 to 9

The above components were mixed in proportions shown in Table 1, and the mixtures were fed to a twin-screw vented extruder preset at a temperature of 320° C. and then melt-kneaded to prepare flame-retardant polyamide compositions in the form of pellets. Then, properties of the resulting flame-retardant polyamide compositions were evaluated. The results are set forth in Table 1.

Comparative Examples 1 to 6

The above components were mixed in proportions shown in Table 2, and using the mixtures, flame-retardant polyamide compositions in the form of pellets were prepared in the same manner as in the above Examples. Then, properties of the resulting flame-retardant polyamide compositions were evaluated. The results are set forth in Table 2.

TABLE 1

| | | | Example | | | | | | | | |
|---|---|---|---|---|---|---|---|---|---|---|---|
| | | Unit | 1 | 2 | 3 | 4 | 5 | 6 | 7 | 8 | 9 |
| Polyamide resin (A) | Type | — | A-1 | A-1 | A-1 | A-1 | A-2 | A-3 | A-1 | A-1 | A-4 |
| | Proportion | wt % | 43.1 | 41.3 | 41.3 | 42.3 | 41.3 | 41.3 | 44.3 | 41.6 | 41.3 |
| | Intrinsic Viscosity [η] | dl/g | 0.8 | 0.8 | 0.8 | 0.8 | 1.0 | 0.8 | 0.8 | 0.8 | 1.0 |
| Flame retardant (B) | Type | — | B-1 | B-1 | B-1 | B-2 | B-1 | B-1 | B-1 | B-1 | B-1 |
| | Proportion | wt % | 23.0 | 23.0 | 23.0 | 22.0 | 23.0 | 23.0 | 20.0 | 23.0 | 23.0 |
| Antimony compound (C) | Proportion | wt % | 0.25 | 0.37 | 0.37 | 0.37 | 0.37 | 0.37 | 0.37 | 0.05 | 0.37 |
| Salt of zinc or calcium (D) | Type | — | D-1 | D-1 | D-2 | D-1 | D-1 | D-1 | D-1 | D-1 | D-1 |
| | Proportion | wt % | 1.25 | 2.63 | 2.63 | 2.63 | 2.63 | 2.63 | 2.63 | 2.65 | 2.63 |
| Total of component (C) and component (D) | Proportion | wt % | 1.50 | 3.00 | 3.00 | 3.00 | 3.00 | 3.00 | 3.00 | 2.70 | 3.00 |
| Reinforcement (E) | Proportion | wt % | 30.0 | 30.0 | 30.0 | 30.0 | 30.0 | 30.0 | 30.0 | 30.0 | 30.0 |
| Flammability test | UL94 Standard evaluation | — | V-0 | V-0 | V-0 | V-0 | V-0 | V-0 | V-0 | V-0 | V-0 |
| | Total of flaming time | sec. | 5 | 5 | 4 | 5 | 7 | 5 | 6 | 6 | 8 |

TABLE 1-continued

|  |  | Unit | Example 1 | 2 | 3 | 4 | 5 | 6 | 7 | 8 | 9 |
|---|---|---|---|---|---|---|---|---|---|---|---|
| Mechanical Properties | Flexural test (toughness) | mJ | 52 | 50 | 45 | 53 | 48 | 47 | 55 | 51 | 44 |
|  | Reflow heat resistance | °C. | 260 | 260 | 255 | 260 | 260 | 255 | 265 | 260 | 270 |
|  | Flow length | mm | 69 | 70 | 79 | 45 | 63 | 71 | 66 | 70 | 61 |
| Residence stability |  | sec. | >600 | >600 | >600 | 600 | >600 | >600 | >600 | >600 | >600 |
| Evaluation of drooling and foaming |  | — | AA | AA | AA | BB | AA | AA | AA | AA | AA |
| Proportion defective of manufactured articles |  | % | <0.1 | <0.1 | <0.1 | 0.1 | <0.1 | <0.1 | <0.1 | <0.1 | <0.1 |
| Quantity of bromine gas generated |  | ppm | 1 | 3 | 4 | 60 | 2 | 2 | 2 | <1 | 2 |

TABLE 2

|  |  | Unit | Comparative Example 1 | 2 | 3 | 4 | 5 | 6 |
|---|---|---|---|---|---|---|---|---|
| Polyamide resin (A) | Type | — | A-1 | A-1 | A-1 | A-1 | A-1 | A-1 |
|  | Proportion | wt % | 41.3 | 41.3 | 41.3 | 41.3 | 44.3 | 42.3 |
|  | Intrinsic Viscosity [η] | dl/g | 0.8 | 0.8 | 0.8 | 0.8 | 0.8 | 0.8 |
| Flame retardant (B) | Type | — | B-1 | B-1 | B-1 | B-1 | B-1 | B-2 |
|  | Proportion | wt % | 23.0 | 23.0 | 23.0 | 23.0 | 20.0 | 22.0 |
| Antimony compound (C) | Proportion | wt % | 3.00 | 2.63 | 0.50 | 0.00 | 0.00 | 0.50 |
| Salt of zinc or calcium (D) | Type | — | — | D-1 | D-1 | D-1 | D-1 | D-1 |
|  | Proportion | wt % | 0.00 | 0.37 | 2.50 | 3.00 | 3.00 | 2.50 |
| Total of component (C) and component (D) | Proportion | wt % | 3.00 | 3.00 | 3.00 | 3.00 | 3.00 | 3.00 |
| Reinforcement (E) | Proportion | wt % | 30.0 | 30.0 | 30.0 | 30.0 | 30.0 | 30.0 |
| Flammability test | UL94 Standard evaluation | — | V-0 | V-0 | V-0 | V-0 | V-1 | V-0 |
|  | Total of flaming time | sec. | 5 | 5 | 5 | 40 | 60 | 4 |
| Mechanical Properties | Flexural test (toughness) | mJ | 49 | 50 | 50 | 50 | 55 | 53 |
|  | Reflow heat resistance | °C. | 260 | 260 | 260 | 260 | 265 | 260 |
|  | Flow length | mm | 70 | 69 | 68 | 70 | 67 | 46 |
| Residence stability |  | sec. | 420 | 480 | 600 | >600 | >600 | 540 |
| Evaluation of drooling and foaming |  | — | CC | CC | BB | AA | AA | BB |
| Proportion defective of manufactured articles |  | % | 1.2 | 0.9 | 0.3 | <0.1 | <0.1 | 0.5 |
| Quantity of bromine gas generated |  | ppm | 2000 | 850 | 10 | <1 | <1 | 200 |

INDUSTRIAL APPLICABILITY

The flame-retardant polyamide composition of the present invention is a material which can inhibit generation of a gas, formation of decomposition products and discoloration of molded articles even under high molding temperature conditions, has excellent incombustibility and toughness and is excellent in heat resistance in the reflow soldering step, said heat resistance being required for surface mounting. Therefore, the flame-retardant polyamide composition can be favorably used for electrical and electronic parts or in a field of precision molding.

The invention claimed is:

1. A flame-retardant polyamide composition comprising 20 to 80% by mass of a polyamide resin (A), 5 to 40% by mass of a flame retardant (B), 0.01 to 0.45% by mass of sodium antimonate (C) and 0.5 to 10% by mass of a salt of zinc or calcium (D).

2. The flame-retardant polyamide composition as claimed in claim 1, wherein the salt of zinc or calcium (D) is at least one compound selected from zinc borate, zinc stannate, zinc phosphate, calcium borate and calcium molybdate.

3. The flame-retardant polyamide composition as claimed in claim 1, wherein the flame retardant (B) is at least one compound selected from brominated polystyrene, polybrominated styrene and brominated polyphenylene ether resins.

4. The flame-retardant polyamide composition as claimed in claim 1, wherein the antimony compound (C) is sodium antimonate, and the salt of zinc or calcium (D) is zinc borate.

5. The flame-retardant polyamide composition as claimed in claim 1, wherein the polyamide resin (A) comprises a carboxylic acid component comprising 30 to 100% by mol of terephthalic acid units, and 0 to 70% by mol of an aromatic polyfunctional carboxylic acid compound other than terephthalic acid and/or 0 to 70% by mol of an aliphatic polyfunctional carboxylic acid compound of 4 to 20 carbon atoms, and an amine component comprising a polyfunctional amine compound of 4 to 25 carbon atoms.

6. The flame-retardant polyamide composition as claimed in claim 1, further comprising 0 to 60% by mass of at least one substance selected from glass, mica and titanium oxide as a reinforcement (E).

7. The flame-retardant polyamide composition as claimed in claim 1, wherein the polyamide resin (A) has a melting point of 280 to 340° C. and an intrinsic viscosity [η], as measured in concentrated sulfuric acid at 25° C., of 0.5 to 2 dl/g.

8. A molded article obtained by molding the flame-retardant polyamide composition of claim 1.

9. An electrical or electronic part obtained by molding the flame-retardant polyamide composition of claim 1.

10. A process for preparing the flame-retardant polyamide composition of claim 1.

11. The flame-retardant polyamide composition as claimed in claim 1, wherein the amount of the salt of zinc or calcium (D) is 1 to 3% by mass.

12. The flame-retardant polyamide composition as claimed in claim 1, wherein the total amount of the sodium antimonate (C) and the salt of zinc or calcium (D) is 1 to 3.5% by mass.

* * * * *